United States Patent [19]

Nimerick et al.

[11] Patent Number: 5,103,913
[45] Date of Patent: Apr. 14, 1992

[54] METHOD OF FRACTURING HIGH TEMPERATURE WELLS AND FRACTURING FLUID THEREFORE

[75] Inventors: Kenneth H. Nimerick, Tulsa, Okla.; Curtis L. Boney, Houston, Tex.

[73] Assignee: Dowell Schlumberger Incorporated, Tulsa, Okla.

[21] Appl. No.: 626,350

[22] Filed: Dec. 12, 1990

[51] Int. Cl.$^5$ ............................................. E21B 43/267
[52] U.S. Cl. .................................. 166/308; 166/280; 252/8.551
[58] Field of Search ............... 166/271, 283, 308, 280; 252/8.551

[56] References Cited

U.S. PATENT DOCUMENTS

| | | | |
|---|---|---|---|
| 3,096,284 | 7/1963 | Slate | 252/8.551 |
| 3,153,450 | 10/1964 | Foster et al. | 166/283 |
| 3,163,212 | 12/1964 | Bernard | 166/283 X |
| 3,254,719 | 6/1966 | Root | 166/308 |
| 3,934,651 | 1/1976 | Nierode et al. | 166/283 X |
| 4,042,529 | 8/1977 | Nimerick et al. | 166/283 X |
| 4,210,206 | 7/1980 | Ely et al. | 166/283 X |
| 4,502,967 | 3/1985 | Conway | 252/8.551 |
| 4,566,977 | 1/1986 | Hatfield | 252/8.551 R |
| 4,848,467 | 7/1989 | Cantu et al. | 166/283 X |

*Primary Examiner*—George A. Suchfield
*Attorney, Agent, or Firm*—Stephen A. Littlefield

[57] ABSTRACT

The high temperature stability of an aqueous fracturing fluid is extended for use in high temperature (above 300° F.) subterranean formations through the addition of quantities of unhydrated, particulate guar or guar derivative polymers prior to the pumping of the fracturing fluid into the formation. Additional high temperature stability is achieved through the addition of soluble bicarbonate to the fracturing fluid and raising the pH of the fracturing fluid to about 9.2 to 10.4.

3 Claims, No Drawings

METHOD OF FRACTURING HIGH TEMPERATURE WELLS AND FRACTURING FLUID THEREFORE

This invention relates to the art of the production of hydrocarbons from subterranean formations, and more particularly, to a process and composition for fracturing high temperature (above about 300° F.) subterranean formations to stimulate the production of hydrocarbons.

BACKGROUND OF THE INVENTION

In the process of recovering hydrocarbons from a subterranean formation through a wellbore penetrating the formation, it is common to stimulate production and facilitate transport of the hydrocarbons to the wellbore by the process of hydraulic fracturing. In the hydraulic fracturing process, a fluid is pumped into the zone of interest at a pressure high enough to overcome the reservoir pressure and pressure transmitted by the overburden to a point where the rock within the formation fractures. In a typical fracture operation, following the initiation of a fracture, additional quantities of fracturing fluid are pumped into the formation to extend and widen the fractures. Later-pumped quantities of fluid typically contain a proppant material, usually in gradually increasing quantities in the fracturing fluid. Upon fracture closure with release of the fracturing fluid pressure the proppant remains within the fracture offering a permeable channel through which formation fluids can flow more easily to the wellbore for production to the surface.

The fracturing fluids, particularly those used to transport proppants generally comprise gelled aqueous fluids having a viscosity sufficient to suspend the proppant within the fluid for pumping and placement within the fractures. Typical gelled fracturing fluids comprise galactomanan polymers which are commonly cross-linked using an organo-metallic compound. Guar and substituted guar polymers such as hydroxypropyl and carboxymethylhydrocypropyl guar are commonly used. For relatively high temperature applications (above about 200° F.) crosslinking of these guar-based polymers is effected with a zirconium, hafnium or titanium crosslinking organo-metallic compound.

At temperatures above about 300°-325° F., however, the stability and, thus, the proppant-carrying capacity of such crosslinked gel fracturing fluids is relatively low. The high temperatures cause a breakdown of the polymer and early release of the proppant from the gel. In the past, in order to reduce the formation temperature effects on a fracturing fluid in high temperature formations, it has been common to pump very large volumes of fluid into a formation as a "pad" without the presence of proppant in order to cool down the formation so that when a proppant-laden fracturing fluid is pumped into the fractures, the temperatures effects of the formation are reduced for a period of time until the formation temperature recovers from the cool-down effects of the initial large pad volume. Such large pad volumes are undesirable because in addition to the high cost of formulating and pumping these large additional volumes, large amounts of polymers are deposited within the fractures after fluid leak-off which polymers can have an adverse affect on fracture conductivity through the proppant pack.

SUMMARY OF THE INVENTION

The present invention provides for a fracturing fluid and method of fracturing of high temperature wells which minimizes the need for utilizing large pad volumes to effect formation cool-down. With the present invention, high temperature stability of the proppant-laden fracturing fluid is enhanced without the need for prior cool-down of the formation by large volumes of pad solution.

In accordance with the invention, a fracturing fluid to be pumped into a wellbore comprises a gelled aqueous solution of a hydrated polymer selected from a group consisting of guar and substituted guar polymers and further including the addition, immediately prior to pumping, of the selected polymer in solid particulate, non-hydrated form.

Further in accordance with the invention, a method of fracturing a subterranean formation comprises in sequence, the steps of providing a hydrated aqueous gel solution containing a polymer selected from a group consisting of guar and substituted guar polymers, adding additional amounts of the selected polymer in particulate, non-hydrated form to the gelled aqueous solution and pumping the gelled aqueous solution containing the hydrated and unhydrated selected polymer into the formation to effect fracturing thereof.

It is therefore an object of this invention to provide a fracturing fluid and method of fracturing of high temperature gels whereby the use of large pad volumes in order to effect formation cool down is avoided.

It is a further object of this invention to enhance the high temperature stability of a fracturing fluid for high temperature formations.

DETAILED DESCRIPTION OF THE PREFERRED EMBODIMENTS

It will be understood that the following detailed description of the preferred embodiments is presented for the purpose of illustrating the invention only and that variations and modifications of the examples presented may be made and are included within the scope of the present invention.

In formulating a fracturing fluid for use in high temperature formations, a typical fracturing fluid utilized for moderate temperature formation is first formulated. In this manner, a guar or substituted guar polymer is hydrated in an aqueous solution either continuously or by a batch mix process and having a polymer loading in the range of about 0 to 100 lbs polymer per 1000 gal. of aqueous fracturing fluid depending on the required viscosity necessary to carry the desired amount of proppant. As is common, additional amounts of such materials such as crosslinking agents comprising organo-metallic compound of, typically, titanium, hafnium or zirconium, pH control agents, crosslinking delay agents antifoamers, surfactants and the like are added to the hydrated gel solution during the mixing process. Additionally, an alcohol such as methanol, ethanol or isopropanol may be added to the mix water to retard hydration of the polymers as is well known. Proppant may be optionally added to the gelled aqueous solution in amounts ranging from 0 upwards to about 15 lbs. proppant per gallon of solution.

In accordance with the invention, at a time immediately prior to pumping the solution into the wellbore, generally contemporaneously with the addition of proppant to the gelled aqueous solution, additional relatively large amounts of unhydrated polymer are added to the gelled aqueous solution in amounts ranging from about 20 to about 250 pounds of such additional, unhydrated polymer per 1000 gallons of fracturing fluid and pumped through the wellbore to the formation of interest. The unhydrated particulate polymer is generally provided in suspension in a non-aqueous, hydrocarbon slurry medium such as diesel oil.

The high temperature stability has also been found to be substantially extended when the above fracturing fluid includes crosslink delay additive comprising soluble bicarbonate. Crosslink delay additives are additives which delay organo-metallic and inorganic salts crosslinkers from crosslinking the polymer molecule until the polymer molecule has hydrated sufficiently to prevent a reduced gel quality. Bicarbonate delay additives may be used in conjunction with or supplemental to organo-metallic chelants as part of a crosslink delaying mechanism. The amounts of bicarbonate required vary with the various organo-metallic crosslinkers and also with the chelants for these crosslinkers but are generally added in amounts ranging from 1–100 lbs. of bicarbonate per 1000 gallons of fluid. Any bicarbonate salts may be used such as ammonium, sodium or potassium bicarbonate but sodium and potassium carbonate are more preferred due to greater heat stability and potassium bicarbonate is preferred where high concentrations of bicarbonate is desired due to its substantially greater solubility in water as compared with sodium bicarbonate.

It is also been found that by raising the pH of the formulated fracturing fluid from its normal pH of about 8.5 to about 9.1 to the elevated pH in the range of about 9.2 to 10.4, the crosslink gel becomes even more high temperature stable with minimal loss of the crosslinking delay mechanism. Suitable pH elevating additives are soda ash, magnesium and calcium oxide, ammonium-, Group I- or Group II-hydroxide, sodium aluminate or any other well-known oxide, hydroxide or other basic material common in the art.

EXAMPLES

The following examples will serve to illustrate the preferred embodiment of the invention only. Each example should not be considered as a limitation upon the scope of this invention.

EXAMPLE I

A well having a depth of 13,700 feet and a bottomhole temperature of 350° F. was successfully fractured utilizing a fracturing fluid which comprise an aqueous gel having 60 lbs. of hydrated hydroxypropyl guar per 1000 gallons of fluid wherein an additional 100 lbs. of unhydrated, particulate hydroxypropyl guar was added in a diesel slurry to the fracturing fluid immediately prior to pumping into the wellbore. An aqueous organic zirconium crosslinking agent was added to the solution as a 40% active mixture in a an amount of 0.09 gallons of crosslinker solution per pound of polymer. A crosslink delay/buffer additive comprising sodium bicarbonate in amounts of about 50 lbs. per 1000 gallons of fracturing fluid was also added. 80,000 gallons of the above fluid containing 20% methanol was pumped in a pad at an average pump rate of 10.5 barrels per minute at a surface pressure of 14,750 psi. The additional amounts of unhydrated polymer in this pad volume stabilized the fracturing fluid so that the proppant stages in which proppant was added in a ramped stage procedure from about 1 lb. proppant per gallon up to about 10–11 lbs. proppant per gallon were pumped with a hydrated, crosslinked hydroxypropyl guar fracturing fluid having polymer loadings in the range of about 50 to about 70 lbs. per 1000 gallons of fracturing fluid. After 3,600 lbs. of proppant were pumped, a slight increase in surface pressure was noted and the fracturing procedure was terminated followed by a normal flush.

EXAMPLE II

In a 15,000 foot well having a bottomhole temperature of 407° F., 20,000 gallons of pad solution comprising 60 lbs. per 1000 gallons hydrated hydroxypropyl guar and 70–100 lbs. per 1000 gal hydroxypropyl guar. Additional pad volume of 220,000 gallons of crosslinked 70 lb. per gallon hydrated hydroxypropyl guar fluid was then pumped followed by an additional 20,000 gallons of 60 lbs. per 1000 gallons hydrated hydroxypropyl guar further including 70–100 lbs. per 1000 gallons unhydrated hydroxypropyl guar.

This same 60 lbs. hydrated/100 unhydrated crosslinked hydroxypropyl guar solution was then used to pump 650,000 lbs. of proppant in a pumping schedule which began at proppant loadings of 1 lb. proppant per gallon and ending at about 10 lbs. proppant per gallon of fracturing fluid. All hydrated/unhydrated hydroxypropyl guar fracturing fluids contained 20% methanol. Sodium bicarbonate was added to the hydrated gels in amounts of about 50 lbs. per 1000 gallons of fluid.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. In a method of fracturing a subterranean formation comprising the sequential steps of providing an aqueous gelled fracturing fluid containing up to 100 pounds per gallon of a hydrated polymer selected from a group consisting of guar and guar derivatives and pumping the aqueous gelled fracturing fluid into a subterranean formation to effect fracturing thereof, the improvement which comprises adding to the gelled aqueous solution immediately prior to the step of pumping from 20 to about 250 pounds per one thousand gallons of fracturing fluid of said selected polymer in unhydrated, particulate form.

2. The method as set forth in claim 1 further including the step of adding up to about 100 lbs. per 1000 gallons of fracturing fluid of a soluble bicarbonate to the aqueous gelled fracturing fluid.

3. The method as set forth in claim 1 further including the step of adding proppant to the fracturing fluid in amounts ranging from 0 to 15 lbs. per gallon prior to step (c) pumping.

* * * * *